United States Patent [19]
Meaney

[11] Patent Number: 5,287,281
[45] Date of Patent: Feb. 15, 1994

[54] COMPUTER CONTROLLED FLOW OF NITROUS OXIDE INJECTED INTO AN INTERNAL COMBUSTION ENGINE

[75] Inventor: John D. Meaney, Hartland, Mich.

[73] Assignee: Echlin Inc., Branford, Conn.

[21] Appl. No.: 661,898

[22] Filed: Feb. 27, 1991

[51] Int. Cl.⁵ .................... F02D 19/08; F02B 13/10
[52] U.S. Cl. .................... 364/431.05; 123/1 A; 123/531; 123/575; 364/431.08
[58] Field of Search .................... 364/431.05, 431.07, 364/431.08; 123/1 A, 531, 575

[56] References Cited

U.S. PATENT DOCUMENTS

| | | | |
|---|---|---|---|
| 4,182,278 | 1/1980 | Coakwell | 123/1 A |
| 4,331,121 | 5/1982 | Stokes | 123/575 |
| 4,467,764 | 8/1984 | Takasu et al. | 123/416 |
| 4,480,595 | 11/1984 | Hobby et al. | 123/525 |
| 4,494,488 | 1/1985 | Wheatley | 123/1 A |
| 4,503,823 | 3/1985 | Shibukawa et al. | 123/418 |
| 4,572,140 | 2/1986 | Wheatley | 123/541 |
| 4,683,843 | 8/1987 | Norcia et al. | 123/575 |
| 4,750,453 | 6/1988 | Valdespino | 123/575 |
| 4,798,190 | 1/1989 | Vaznaian et al. | 123/531 |
| 4,827,888 | 5/1989 | Vaznaian et al. | 123/531 |
| 4,840,157 | 6/1989 | Furrow | 123/352 |
| 4,960,080 | 10/1990 | O'Neill et al. | 123/254 |
| 5,091,858 | 2/1992 | Paielli | 364/431.12 |

Primary Examiner—Vincent N. Trans
Attorney, Agent, or Firm—Leydig, Voit & Mayer

[57] ABSTRACT

An internal combustion engine system that is selectively powered by an enhanced air/fuel mixture. The supply of fuel to the cylinders of an internal combustion engine is increased in response to the addition of a supplemental oxidizing agent into an air/fuel mixture. The additional fuel may be added by increasing the duty cycle of fuel injectors mounted proximate the individual cylinders. In addition, the ignition timing is adjusted in accordance with the change in the density of the fuel air mixture. The amount of supplemental oxidizing agent provided to the cylinders may be regulated by increasing in a controlled manner the rate at which the supplemental oxidizing agent is supplied over a period of time. Furthermore, the control unit for the engine receives and responds to a number of external operating parameters including the oxygen content of the engine exhaust and the traction of the tires.

35 Claims, 7 Drawing Sheets

SPARK ADVANCE RETARD AT W.O.T.

COMPUTER CONTROLLED FLOW OF NITROUS OXIDE INJECTED INTO AN INTERNAL COMBUSTION ENGINE

Reference is made to the subject matter of U.S. Pat. No. 5,091,858 by Perry M. Paielli for an "Electronic Control of Engine Delivery." The current invention is a nitrous oxide delivery system which may use the type of electronic control unit described in the Paielli application.

FIELD OF THE INVENTION

The present invention relates generally to systems for burning an enhanced concentration of oxidizing agent and fuel in an internal combustion engine, and more particularly, to selectively increasing the concentration of oxidizing agent and fuel in the combustion chambers and controlling the ignition of the oxidizing agent/fuel mixture in order to enhance the output power of the engine without harming the engine or power train, or causing a loss of control of the vehicle due to the sudden increase in power.

BACKGROUND OF THE INVENTION

It is known that one may increase the power delivered by an internal combustion engine by increasing the concentration of oxygen and fuel in the combustion, chambers. Systems employing this technique are widely used in the motor racing field. During normal operation, an internal combustion engine burns an air/fuel mixture consisting of vaporized fuel (supplied from a carburetor or fuel injectors) and air taken directly from the environment in which the engine is operating. It is known that one may increase the concentration of oxygen and fuel in the combustion chambers of an internal combustion engine by increasing the flow of fuel and displacing environmental air flowing into the engine from the air intake ports with an oxygen rich supply of air. One such widely practiced method for increasing the concentration of oxygen supplied to the engine is to deliver oxygen via disassociated nitrous oxide (N2O) to the air intake manifold of the engine.

It is currently neither practical nor advantageous to continuously deliver nitrous oxide whenever the engine is running. Therefore, one problem presented in the development of an effective nitrous oxide and fuel delivery system is determining how to engage the system at a point in time so that the accelerated combustion rate and increased energy supplied by the concentrated oxidizing agent/fuel mixture will enhance the power delivered by the engine without harming the engine or other components of the vehicle.

Typically, the driver enables the nitrous oxide supply system by closing a switch. The nitrous oxide delivery system may immediately administer nitrous oxide and additional fuel after the driver closes the switch, or alternatively the system may be placed in a ready state which must wait for the occurrence of at least one other condition precedent such as the passage of a predetermined period of time. One problem with the immediate administration of the nitrous oxide after an operator closes a switch is that the environment in which the nitrous oxide is utilized (high speed racing) does not favor the added distraction of having to flip a switch during mid-race conditions where the driver's attention is preferably focused upon directing the path of the vehicle and not to manipulating a switch to engage nitrous oxide when certain conditions have been observed by the driver. Therefore, it is desirable to have a control unit within the vehicle to automatically activate the nitrous oxide delivery system when certain relevant vehicle operating conditions have been sensed by the control unit.

A prior nitrous oxide delivery system delays the delivery of nitrous oxide a pre-set period of time after the driver depresses the accelerator. However, waiting a predetermined period of time before engaging the nitrous oxide system fails to account for additional relevant parameters which benefit drivers particularly interested in obtaining and maintaining maximum speed in order to travel a distance in the shortest period of time. It is, therefore, often desirable to utilize a nitrous oxide system that delivers nitrous oxide and additional fuel in response to the occurrence of conditions precedent, other than the passage of time, which are relevant to the optimal operation of the engine and vehicle.

Another problem associated with vehicles powered by nitrous oxide enhanced air/fuel mixtures is the sudden, considerable, increase in power delivered by an engine when the nitrous oxide delivery system is engaged and the concentrated air/fuel mixture begins to power the engine. The sudden increase in torque and horsepower may destabilized the vehicle and cause the driver to lose control of the vehicle. It is thus desirable for the nitrous delivery system, upon demand, to increase to full output at a rate which will provide the maximum power while maintaining the stability of the vehicle.

If additional fuel is not provided to the cylinders when nitrous oxide is added to the air entering the combustion chambers, the air/fuel mixture may "lean out" and as a result detonate instead of burning in a controlled manner. To prevent detonation and obtain maximum engine performance while nitrous oxide is delivered to the air/fuel mixture, additional fuel is added. Prior nitrous oxide systems provide sufficient additional fuel to the cylinders to maintain an air/fuel ratio which provides enhanced power output without detonation when the air/fuel mixture is ignited in the engine.

A proper air/fuel ratio must be maintained within each cylinder in order to obtain the full benefit of the enhanced concentration of oxidizing agent and fuel in the cylinders and to prevent harm to the engine. Prior systems have administered the additional fuel by means of a spray bar mounted at the air intake manifold. This method presents the problem of non-uniform dispersion of the added fuel to each of the cylinders. The additional fuel, small droplets delivered by the spray bar, lacks the mobility which would enable the fuel to disperse evenly in the distinct directions of the air intakes of the individual cylinders. Furthermore, the fuel may accumulate on the sides of the air intake runners before entering the cylinders. The result of these combined factors is that the ratio of the air/fuel mixture cannot be precisely controlled in each of the cylinders. Due to the poor dispersion qualities of the fuel droplets emitted from the spray bar, some cylinders may contain lean air/fuel mixtures while others may contain mixtures which are too rich. It is desirable to precisely control the rate at which fuel is added to each cylinder so that each cylinder burns an optimal ratio of fuel and air.

The fuel/air mixture is ignited in the combustion chamber shortly before the piston reaches the highest position in the cylinder (i.e. the combustion cavity is at its smallest). The period between the ignition and the point where the piston reaches its highest point is called the "spark advance". Spark advance enables the burning gases to exert an optimal force upon the piston resulting in a desirable transmission of energy from the burning air/fuel mixture to the drive shaft coupled to the pistons. Prior systems have adjusted the timing of the ignition as a function of engine speed in order to obtain a favorable conversion of heat energy produced by the burning air/fuel mixture into kinetic energy. However, these systems did not inject nitrous oxide and thus did not address the unique timing problems posed in nitrous oxide burning systems.

When a nitrous oxide delivery system increases the density of the oxidizing agent in the cylinders by injecting nitrous oxide into the flow of air entering the cylinders, the air/fuel mixture burns at an accelerated rate and consequently the maximum pressure in the cylinder is reached at a faster rate than when only environmental air is used to burn the fuel in the cylinders. If the ignition controller does not adjust the spark timing in order to compensate for this faster burn rate when nitrous oxide is added to the air/fuel mixture, the explosive force of the burning gases, even without detonation, will reach a maximum before the piston reaches its highest point in the cylinder. The gases will therefore exert a downward force upon the piston while the crank shaft continues to force the piston upward in the cylinder. Allowing these two forces to oppose one another in the manner described above not only decreases engine power output, it may also damage the engine and/or power train. In order to prevent the counter-productive and possibly destructive opposition of forces described above, the spark advance should be decreased (i.e. "retarded") a calibrated, pre-set, amount when nitrous oxide is added to the air/fuel mixture in order to prevent the explosive force of the burning air/fuel mixture from reaching a maximum until after the piston is on its downward path.

Another sign of too much spark advance is engine knock. This may occur due to a lean air/fuel mixture or erroneous advance calibration by the system designer. It is therefore desirable to provide a knock sensor and to provide a means for adjusting the spark advance in order to eliminate engine knock.

In general, nitrous oxide enhances the power delivered by an engine at a given engine speed. Though it is possible to build an engine and power train strong enough to withstand the increased force delivered by a nitrous oxide burning engine, many vehicles were not designed to endure the increased maximum horsepower and torque delivered by nitrous oxide systems. It is therefore desirable in many instances to adjust the spark advance in order to realize the enhanced output power of an engine at the extreme engine speeds of a given engine's power spectrum and bleed off some of the enhanced power potential at certain engine speeds where the output power and/or torque exceed the structural limitations of the engine or power train.

It is also desirable to provide means for allowing the user of the nitrous oxide system to easily tune the operation of the system by modifying the preprogrammed spark advance values. However, if such modification mechanisms are available to the user, additional safeguards should be included to protect the engine and vehicle against erroneous input values which may destroy the engine and/or drive train.

The ideal quantity of fuel added to a given volume of air changes when environmental conditions change. The ideal amount of fuel is affected by such factors as air temperature, barometric pressure, humidity, and impurities. It is thus desirable for the fuel delivery to modify the amount of fuel delivered to the cylinders in response to changes in environmental conditions. Some prior art fuel delivery systems measure factors such as those listed above directly and adjust the fuel delivery rate accordingly. An alternative system known in the prior art reacts to the level of oxygen in the engine exhaust and adjusts the fuel supply in order to obtain favorable levels of certain exhaust gases. More particularly, prior systems position oxygen sensors in the exhaust path which abruptly change state and provide a signal when the air/fuel ratio rises above or falls below a specific ratio. A common switch point in the prior systems was a 14.7 to 1 ratio. However, these oxygen sensing systems provide neither the necessary feedback for maintaining the desired air/fuel mixture for nitrous oxide combustion nor the appropriate information for determining the degree to which the air/fuel ratio deviates from the ideal ratio.

SUMMARY OF THE INVENTION

In order to meet the unique demands and problems associated with engines burning a concentrated air/fuel mixture, a nitrous oxide system has been developed. The nitrous oxide delivery system of the current invention automatically engages and commences delivery of nitrous oxide and increased amounts of fuel into the combustion chambers of an engine when certain vehicle performance conditions have been met, adjusts the amount of nitrous oxide and fuel delivered in response to detected operating conditions, and adjusts the spark advance in order to provide an optimal amount of power to the drive train of a vehicle while taking into consideration the physical limitations of the vehicle and driving conditions under which the vehicle is operating. Furthermore, the system may be quickly and easily re-programmed so that the nitrous oxide system may be adapted to operate in a wide variety of engines, driving surfaces, and driving conditions.

First, this system begins to deliver nitrous oxide and an enhanced quantity of fuel to the cylinders of the engine when certain critical vehicle performance conditions have been sensed by an electronic control unit. The control unit provides signals for operating the nitrous oxide delivery, fuel delivery, and electronic ignition systems. Since the conditions are received as digitized signals by the processor and compared against predetermined thresholds stored in the processor's memory, the user may re-program the processor to alter the thresholds or completely disregard a condition in deciding under what conditions to engage the nitrous oxide delivery system.

Second, this system controls the rate at which the nitrous oxide is delivered to the cylinders. Instead of offering only an on/off choice of nitrous oxide delivery to the cylinders, the nitrous oxide delivery system possesses the capability of delivering nitrous oxide and fuel at full capacity as well as lesser amounts to the engine's cylinders thus facilitating the implementation of a preprogrammed gradual increase in power delivered by the engine. The flow rate may be a function of a variety of parameters readily available to the control unit such as time, tire traction, and throttle position. The choice of a parameter may be programmed into the system, thus enabling the user maximum flexibility in selecting controlling parameters and their effect upon the rate of flow of nitrous oxide and/or fuel.

Third, the system provides for an increased supply of fuel to the cylinders in order to avoid a lean air/fuel mixture which would result in detonation instead of a controlled burn of the air/fuel mixture in the cylinders. In one embodiment of the current invention, the added fuel is injected into the cylinders through existing fuel injectors whose duty cycle is lengthened in order to provide the necessary additional fuel to maintain the desired air/fuel ratio. Alternatively, an additional fuel injector or variable flow rate valve may be mounted proximate to each cylinder in order to maintain precise control over the amount of fuel received by each cylinder.

Fourth, the system provides ignition timing adjustment control for harnessing the maximum power usable by the engine and drive train. When the engine is operating in the low or the high speed ranges of a given engine's power spectrum, the spark advance is adjusted to enable the pistons to receive the maximum energy which can be converted from heat to kinetic energy. When the engine is operating in the middle range of the power spectrum and the maximum force which the burning air/fuel mixture is capable of exerting upon the piston exceeds the limitations of the engine and/or power train, the ignition is delayed in order to reduce the force exerted by the burning nitrous oxide enhanced air/fuel mixture. This adjustment prevents harm to the engine and power train.

Fifth, the system provides a sensor to detect and signal engine knock resulting from an improper spark advance calibration and means for adjusting the spark advance to eliminate the detected engine knock.

Sixth, the system provides closed loop control over the amount of fuel injected into the cylinders by monitoring the concentration of oxygen in the exhaust. A sensor monitors the engine exhaust and provides an analog signal whose magnitude corresponds to the concentration of oxygen in the exhaust. The analog signal provides a means for dynamically adjusting the amount of fuel provided to the cylinders in order to maintain a desired air/fuel ratio.

Seventh, additional sensors may be included to detect loss of traction by comparing the detected rotational speed of the front wheels and the rotational speed of the rear wheels or sensors may be added to the system to detect diminished acceleration of the vehicle due to loss of traction.

DETAILED DESCRIPTION OF THE DRAWINGS

Reference is again made to the subject matter of U.S. Pat. No. 5,091,858, from which a description of a description of an electronic control unit for engine fuel delivery is taken.

Figure 1:
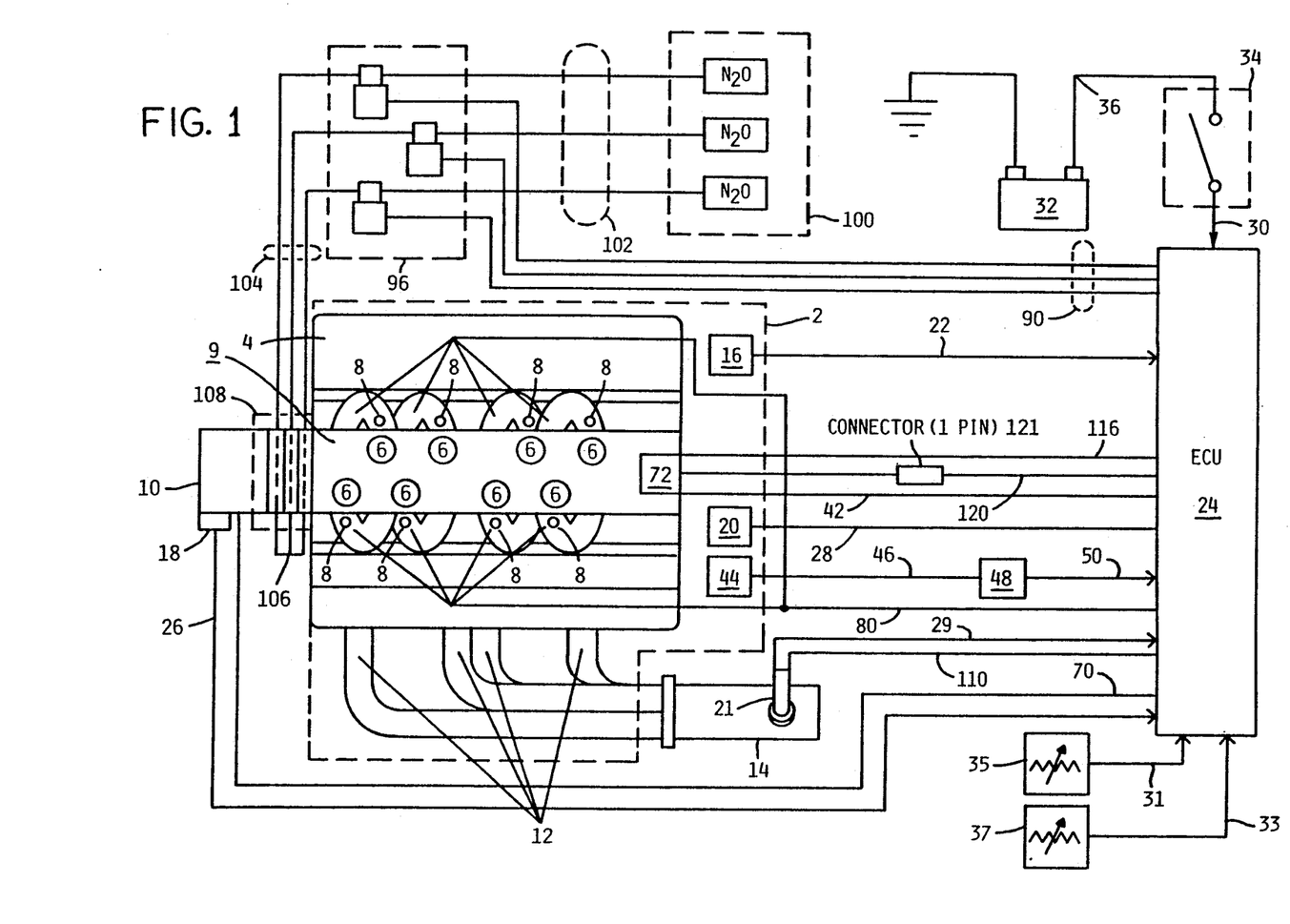
FIG. 1 is a diagramatic representation of one embodiment of the improved system.

Turning first to FIG. 1, a preferred embodiment of the system for selectively combining nitrous oxide in an air/fuel mixture is shown in combination with a conventional eight cylinder internal combustion engine 2. The engine as illustrated includes an engine block 4, and a plurality of cylinders and pistons 6. Each cylinder is provided with one or more injectors 8 positioned proximate to the cylinders 6 in a manner known in the art. An air intake manifold 9, an exhaust manifold 12 which joins with an exhaust pipe 14, and an intake manifold absolute pressure (MAP) sensor 16 are provided. A throttle position sensor (TPS) 18 is affixed to the throttle shaft of the air valve 10 and transmits an analog electronic signal on line 26 to an electronic control unit (ECU) 24. An engine speed sensor (ESS) 20 is included in the system which is coupled to the ignition coil primary in a manner well known to those skilled in the art, and provides an electronic signal on line 28 to the ECU 24. An oxygen sensor unit 21 as well as other well known sensors, not shown, are provided for determining the operating conditions of the engine such as coolant temperature, air temperature, and battery voltage.

The aforenoted sensors provide engine performance information to the electronic control unit (ECU) 24. The MAP sensor 16 transmits an analog electronic signal representing the magnitude of the manifold absolute pressure on line 22 to the electronic control unit (ECU) 24. The signal transmitted on line 26 from the TPS 18 to the ECU 24 represents the fraction of full-open the throttle has been adjusted thus indicating the extent to which the air intake path is open. The throttle position is controlled by the operator of the vehicle.

By measuring the time span between successive pulse signals from the ignition coil primary on line 28, the ECU 24 may determine the engine speed. Alternatively, the engine speed may be determined from the reference signal on line 42 from the ignition module 72 by measuring the period between successive reference pulses in a manner well known to those skilled in the art. Both types of sensing devices are depicted in FIG. 1, however, only one signal would be routed to the ECU 24 in actual practice of this system.

The oxygen sensor 21 within the exhaust pipe 14 transmits an analog signal on line 29 to the ECU 24. The voltage of the signal on line 29 indicates the concentration of oxygen in the exhaust. An appropriate oxygen sensor would be the Bosch B 258 104 001.

ECU 24 selectively receives a 12 volt electrical potential on line 30. The electrical path between a battery 32 and the ECU 24 is opened and closed by a switch 34 controlled by the operator. Switch 34 receives the electrical energy on line 36 and relays the electrical potential on line 30 to the ECU 24 when the switch 34 is closed.

When engine knock is detected, the ECU 24 selectively receives a spark retard enable signal on line 50. A knock sensor 44 is provided which transmits a signal on line 46 to a knock module 48 which in turn conveys this information on line 50 to the ECU 24 in a manner well known to those skilled in the art.

Input lines 31 and 33 to the ECU 24 connect to potentiometers 35 and 37 respectively. The operator adjusts the idle and wide-open throttle (WOT) operation of the engine 2 by adjusting the variable resistance of the potentiometers 35 and 37 respectively in a manner well known to those skilled in the art.

Two additional input signals received by the ECU 24 on lines 38 and 40 represent the velocity of the front wheels and the velocity of the rear wheels respectively. These signals are received by the ECU 24 and compared in order to determine whether the drive wheels have lost traction with the driving surface. In one embodiment of the invention, the rate of delivery of nitrous oxide and fuel is decreased in response to the detection of a loss of traction. Alternatively, an analog signal from an accelerometer may be received by the ECU 24 in order to detect the loss of traction in the drive wheels.

Figure 3:
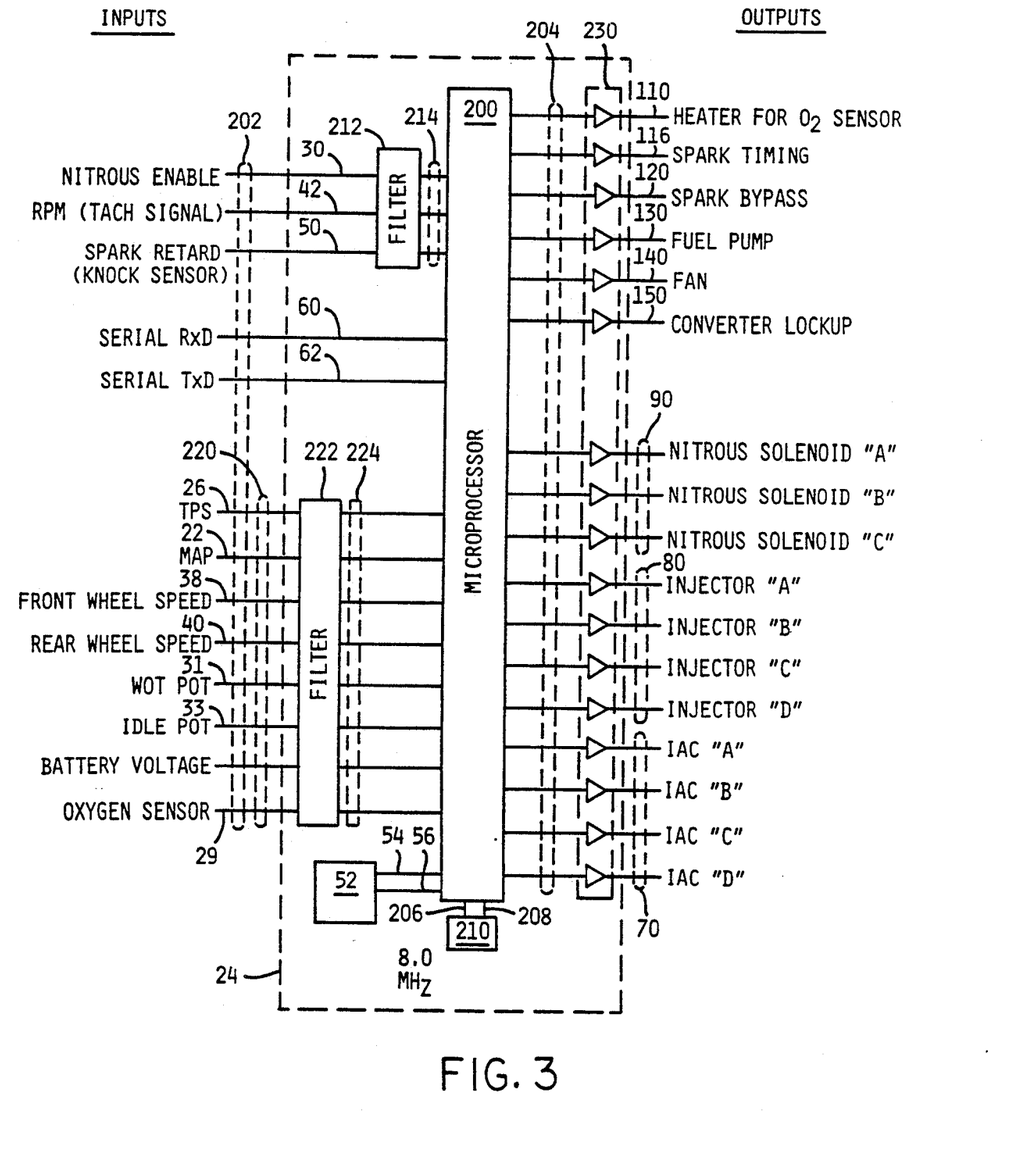
FIG. 3 is a block diagram of the Electronic Control Unit (ECU) for use in one embodiment of the improved system.

Turning briefly to FIG. 3, serial RxD and serial TxD on lines 60 and 62 respectively provide the ECU 24 programming interface. These inputs are selectively connected to a programming source (not pictured) such as a personal computer capable of communicating with the ECU 24 by means of I/O ports in any manner well known to those skilled in the art. The programming source provides data for modifying look-up tables stored in electronically erasable programmable ROM (EEPROM, not pictured) contained in the ECU 24 in a manner well known to those skilled in the art.

Other sensors or inputs may be included in order to meet specific design and performance needs. The inclusion of additional sensors is well known to those skilled in the art. Alternatively, some applications of the current invention will not require all the inputs described above and deletion of some would be a design decision within the knowledge of one skilled in the art.

The ECU 24 transmits an electronic spark timing adjustment signal on line 116 to the ignition module 72. The ignition module 72 adjusts the timing, i.e. the spark advance, of the distributor (not pictured) in accordance with the spark adjustment signal received on line 116. The distributor (not pictured) in turn distributes the coil voltage to the appropriate spark plug to ignite the air/fuel mixture contained in one of the cylinders 6. This method as well as other suitable methods of controlling the air/fuel ignition timing in response to timing adjustment signals is well known to those skilled in the art.

Furthermore, the described structure for transmitting ignition timing signals to each of the cylinders is intended to be exemplary. Other structures for accomplishing this function would be well known to those skilled in the art.

The preferred stand-alone embodiment of the ECU 24 transmits control signals on lines 70 to a stepper motor which controls a pintle which in turn controls the amount of air by-passed into the air intake manifold 9 in a manner well known to those skilled in the art.

The preferred embodiment of the ECU 24 transmits electronic signals on lines 80 to the fuel injectors 8. These signals control the percentage of "on time" ("duty cycle") for each of the fuel injectors 8. The duty cycle of each of the fuel injectors 8 may be individually adjusted to compensate for performance differences in the injectors. The duty cycle may also be increased in order to deliver additional fuel when the nitrous oxide is introduced through the spray bars 106 into the flow of air entering the air intake manifold 9.

Figure 2:
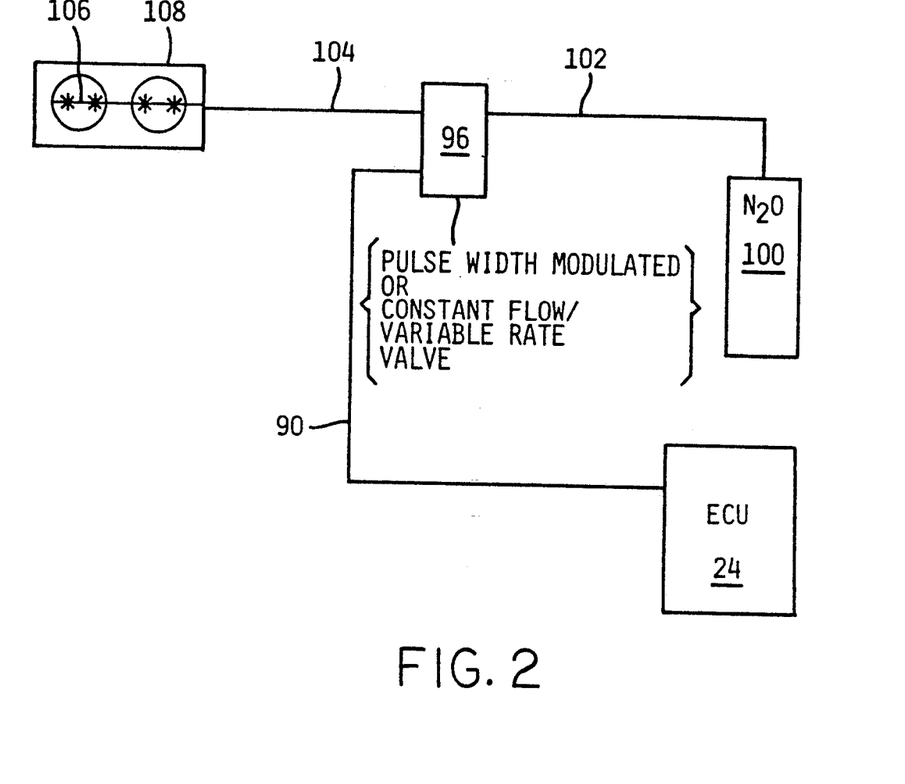
FIG. 2 is a fragmentary diagramatic representation of an alternative nitrous delivery configuration utilizing a single nitrous oxide source.

The ECU 24 in the preferred nitrous oxide administration system transmits solenoid valve control signals on lines 90 to the solenoid valves 96. Appropriate solenoids for transmitting the nitrous oxide are the Skinner B2JX313 or Compucar 255005 solenoid valves. In alternative embodiments only a single control line would be provided as is shown in FIG. 2 to a pulse width modulated valve or constant flow/variable flow rate valve 96 controlled by signals transmitted on line 90. An example of an appropriate pulse-width modulated valve would be the Servo Jet 3101C1 or 3071C1. An example of an appropriate constant flow variable rate valve would be the LMI Inc. 100–400MC.

The nitrous oxide is stored in a pressurized container 100. Examples of appropriate nitrous oxide containers are the Nitrous Oxide Systems 14740 or the Compucar 201010. When nitrous solenoid valves 96 are opened, nitrous oxide flows through supply lines 102, solenoid valves 96, and the receiver supply lines 104, see FIG. 1. The receiver supply lines 104 are terminated by the spray bars 106 held in place by spacer plates 108 positioned at the opening of the air intake manifold 9. Alternatively, the spray bars 106 may be separated and distributed to individual air intake runners or other distribution points in the engine 2 as would be obvious to one skilled in the art. In addition, the spray bars may be replaced by any suitable substitute such as port mounted nozzles or a feed manifold which connects to port mounted nozzles.

The ECU 24 transmits a set of standard control signals present in electronically controlled engines currently used in the automotive industry today and well known to those skilled in the art. The ECU 24 transmits a signal on line 120 to the ignition module 72 for disabling the spark ignition module in order to facilitate physical adjustment of the ignition module in a manner known to those skilled in the art. Line 120 is manually connected to or disconnected from the ignition module 72 by means of a one pin connector 121. The ECU 24 transmits control signals to a fuel pump and a fan (not pictured). The ECU 24 may also transmit a converter lockup signal on line 150 as shown in FIG. 3 to a torque converter (not pictured) in order to engage the transmission (not pictured). The control signals description used in the current embodiment of this invention is not intended to limit the scope of the current invention. The inclusion of additional control signals or the deletion of any of the standard control signals described above would be design decisions well within the level of one of ordinary skill in the art.

In conjunction with a special oxygen sensor unit 21 for providing an analog voltage signal proportional to the concentration of oxygen in the exhaust, the ECU 24 transmits an oxygen heater control signal on line 110 to the oxygen sensor unit 21. This signal controls a heating unit which maintains the temperature of the oxygen sensor within the unit 21 within a desired operating temperature range.

FIG. 3 illustrates the components and wiring configuration of the preferred stand-alone ECU 24. An alternative embodiment of the ECU 24 for use with a stock GM electronic control unit will be described hereinafter. A microprocessor 200, receives a set of inputs on lines 202 indicating operating conditions of the vehicle, demands for certain actions, and control information. The microprocessor 200 performs appropriate operations in response to the operating conditions and control information. Then the microprocessor 200 transmits appropriate control and status information on lines 204. The microprocessor 200, clocked by timing signals transmitted on lines 206 and 208 by a 8 MHz crystal 210, is preferably an MC 68 HC 11A1FN manufactured by Motorola. However, other suitable well known microprocessors may be used.

The nitrous oxide enable, engine speed, and spark retard enable (from the knock module 48) signals on lines 30, 42 and 50 respectively pass through low pass filters 212 in order to remove high frequency noise from the input lines 30, 42 and 50 which may erroneously activate the nitrous oxide system. Low pass filter 212 transmits each of the three filtered input signals on lines 214 to the microprocessor 200.

The serial interface of the microcomputer 200 is connected to serial receive line 60 and serial transmit line 62. These lines are provided to facilitate modification of look-up tables for operating the system contained in an electronically erasable programmable read only memory (EEPROM) 52. The EEPROM 52 is coupled to the data bus of the microprocessor 200 by lines 54 and the address bus by lines 56.

Input lines 220 are received by low pass filters 222. The filters 222 transmit the conditioned signals on lines 224 to separate analog input ports contained in microprocessor 200. The microprocessor periodically polls each of the analog signals on lines 224 and converts the analog signals into digital signals. The signals are then stored in predetermined locations in memory within the microprocessor 200. The stored values provide data for calculating appropriate control signals for the engine and the nitrous oxide delivery system shown in FIG. 1.

FIG. 3 also shows a set of output lines 204 from microprocessor 200. Internal registers providing the source for signals output on the output lines 204 are loaded for output periodically on an as needed basis in a manner well known to those skilled in the art. Generally, this requires updating the output registers within the microprocessor 200 with fresh control data at least once for each reference pulse received on line 42 from the ignition module 72. The signals on each of the output lines 204 are received by output drivers 230. The drivers 230 transmit signals with sufficient current to transmit the signals received on input lines 204 onto output lines 232 without degradation which may otherwise occur due to capacitive loads attached directly to the microprocessor output lines 204.

Figure 4:
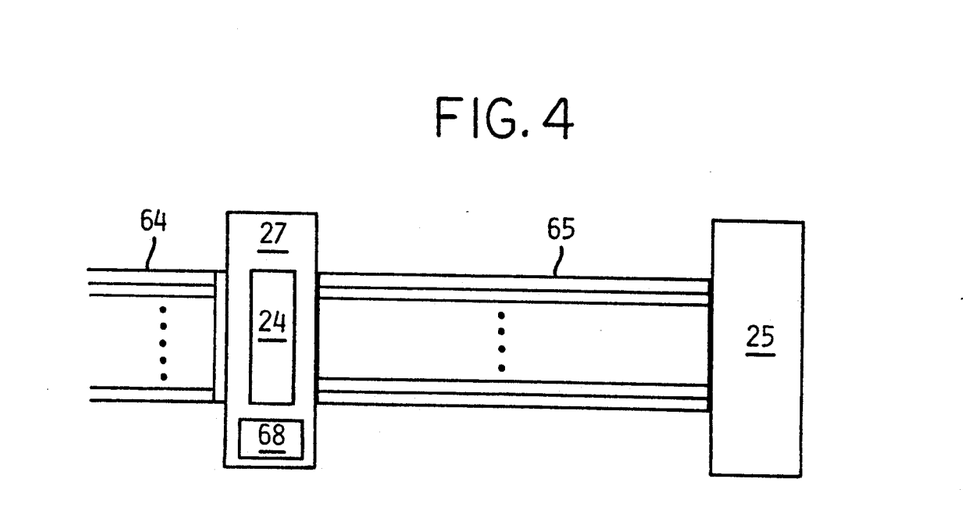
FIG. 4 is a block diagram illustrating the general connection of the ECU to the General Motors stock electronic system.

FIG. 4 shows the external ribbon cable linking of the control box 27 (containing the ECU 24) and the stock General Motors engine control unit 25. The control box 27 receives input signals and transmits control signals on the stock General Motors (GM) ribbon cable 64 whose lines are distributed to various parts of the vehicle in a manner well known to those skilled in the art. The ECU 24 transmits a set of signals on a first set of control lines in ribbon cable 65 to the stock GM control unit 25 for indicating the operating conditions of the engine 2. The GM stock control unit 25 transmits control signals on a second set of control lines in ribbon cable 65 which are selectively routed to the output lines from the control box 27. The stock GM ribbon cable 64 does not support certain input and output signals unique to the nitrous oxide delivery system such as enable line 30, solenoid control line 90, and oxygen sensor heater control line 110. Therefore, these signals must be spliced into the ECU 24 on lines separate from the stock GM ribbon cable 64.

Figure 5:
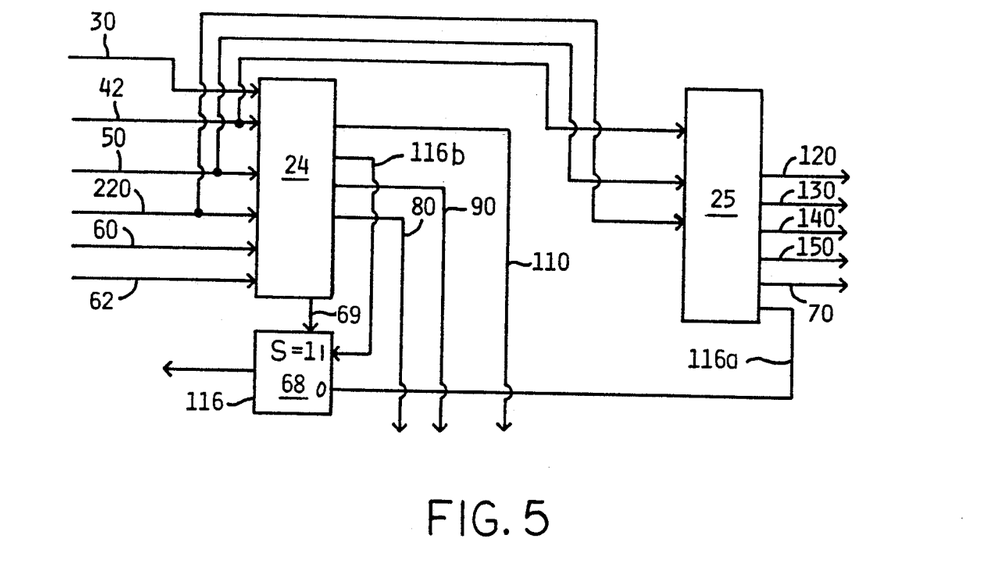
FIG. 5 is a detailed illustration of the connection scheme between the ECU and the General Motors stock control unit.

FIG. 5 is a simplified drawing of the ECU 24 and the General Motors stock electronic control unit 25 and their input and output lines, and is intended to illustrate the modifications to the stand-alone system hardware shown in FIG. 3 in order to operate the two control units 24, 25 in tandem. The stock GM ribbon cable 64 provides all the standard input and output lines for the control units 24, 25. The GM stock ribbon cable 64 does not provide lines for the nitrous enable line 30, the oxygen sensor heater control line 110, and the nitrous solenoid control line 90. Therefore, these lines must be individually connected to the ECU 24. All of the inputs and outputs to the GM stock electronic control unit 25 are contained on the ribbon cable 65 connecting the two control units 24, 25.

Input lines 220, 50 and 42 are routed simultaneously to both control units 24, 25. These signals provide essential information for both of the control units 24, 25 so that the control units may generate appropriate output signals for governing the operation of the engine and nitrous oxide delivery system illustratively depicted in FIG. 1.

In the tandem control configuration illustrated in FIGS. 4 and 5, the GM stock unit 25 enables initial setting of the spark timing and controls operation of the fuel pump by transmitting appropriate signals on line 120 and 130 respectively. The GM stock unit 25 also controls the fan, the transmission lockup and the idle air controller by transmitting signals on lines 140, 150 and 70 respectively. In order to reach the engine 2, the signals are transmitted on ribbon cable 65, relayed through control box 27 without alteration, and back to the stock ribbon cable 64 which carries the signals to appropriate parts of the vehicle.

Three signals are transmitted solely from the ECU 24 and are not affected by the GM control unit 25. First, the ECU transmits fuel injector control signals on the control lines 80 which form part of the bundle of wires transmitting signals on the stock ribbon cable 64. In systems containing an oxygen concentration feedback mechanism, the ECU 24 drives the heater control on line 110 which is not included in the stock ribbon cable 64. The ECU 24 controls one or more solenoids by means of control line(s) 90. In the multiple solenoid valve configuration illustrated in FIG. 1, the single control line 90 could be replaced by a plurality of solenoid control lines as illustrated in FIG. 3. The line(s) 90 carrying the solenoid control signals remains separate from the lines contained in ribbon cable 64.

Finally, the spark timing line 116 is selectively connected to either the ECU 24 or the GM stock control unit 25 through a multiplexer 68. Input lines 116a, 116b are selectively routed through the multiplexer 68 to the output line 116 based upon the polarity of the signal on line 69. Polarity of line 69 is regulated by the microprocessor 200. The microprocessor 200 switches the polarity of the signal on line 69 in response to the detection of wide open throttle conditions based upon throttle position signals received by the microprocessor 200 on line 26 which exceed a pre-programmed threshold. A typical threshold value indicating that the throttle wide open is 80 percent of full open position. However, the threshold may be any other suitable value desired by the nitrous system designer.

When the wide open throttle condition has not been detected, the spark timing line 116 is selectively connected to control line 116a from the GM stock control unit 25. However, when wide open throttle is detected by microprocessor 200, the polarity of the signal on line 69 is changed. This causes the control signal on line 116b from the ECU 24 to be routed through multiplexer 68 to control line 116.

Figure 6:
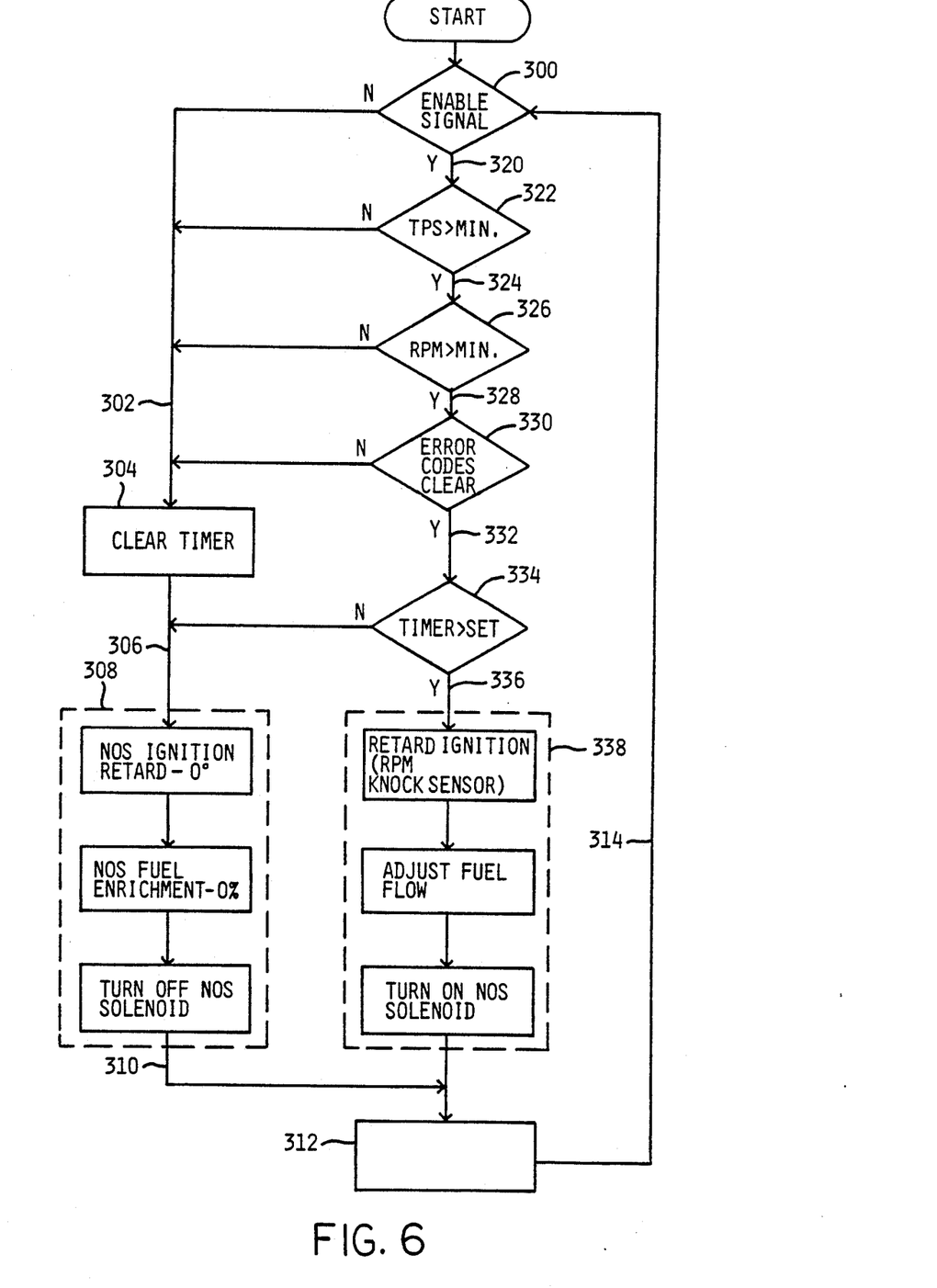
FIG. 6 is a flow diagram illustrating the flow of control in the microprogram for controlling administration of nitrous oxide and adjusting the spark advance and fuel delivery rate in the improved system.

FIG. 6 illustrates the general flow of operation of the nitrous oxide delivery system currently utilized by the piggy-backed system illustrated in FIGS. 4 and 5. The operations described in the following description are executed in the background. In other words, the loop is executed continuously as long as the program execution has not been halted in order to service an interrupt. One interrupt, executed once every eight (8) milliseconds, enables the control units 24, 25 to receive and store all the sensor inputs including the nitrous enable, throttle position and other, vehicle operation parameters.

In its normal background execution cycle, the microprocessor 200 first determines whether the ECU received the nitrous enable signal on line 30. Decision block 300 represents this initial state. If the operator has not enabled the nitrous oxide system, control passes on line 302 to operation block 304 and the nitrous oxide timer (hereafter described) is reset to zero. Next control passes on line 306 to operation block 308 where the microprocessor 200 sets the ignition retard to zero degrees (i.e. no retard). Next, the microprocessor 200 sets the amount of additional fuel to be added to the air/fuel mixture at zero percent (i.e. no enrichment). Finally, the microprocessor 200 sets the nitrous oxide solenoids 96 to the off position by transmitting appropriate signals on line 90 to solenoids 96. After executing the last operation in block 308, computer operation passes on line 310 to block 312 where the microprocessor 200 executes the remaining engine control procedures which are well known to those skilled in the art. In systems containing an oxygen sensor feedback mechanism such as the oxygen sensor unit 21 illustrated in FIG. 1, one noteworthy procedure executed by the microprocessor 200 in block 312 adjusts the fuel flow in response to an improper concentration of oxygen in the exhaust. After the procedures for controlling the vehicle operation are executed in block 312, control then passes on line 314 to the beginning of the control loop at decision block 300 where the microprocessor 200 once again tests whether the operator has enabled the nitrous oxide delivery system.

If the operator has enabled the nitrous oxide delivery system by closing switch 34, then an enable signal will be received on line 30 and stored by the microprocessor 200 during the programmed interrupt for receiving input signals. In response to the presence of an enable signal, control will pass on line 320 from decision block 300 to decision block 322. The microprocessor 200 compares the current throttle position value stored in memory to a pre-selected threshold throttle opening value to determine whether the current position exceeds the throttle opening threshold. If the current throttle position does not exceed the threshold chosen by the system programmer, then control passes on line 302 and follows the sequence through operation blocks 304, 308 and 312 as afore-described.

If the throttle position exceeds the preselected minimum, then control passes on line 324 to decision block 326. Microprocessor 200 compares the current engine speed stored in memory to a pre-selected threshold engine speed to determine whether the current speed exceeds the threshold. If the current engine speed does not exceed the threshold chosen by the system programmer, then control passes on line 302 and follows the sequence through operation blocks 304, 308 and 312 as afore-described.

If the engine speed exceeds the pre-selected minimum, then control passes on line 328 to decision block 330. At decision block 330 the microprocessor 200 tests status values received from sensors which indicate error conditions. If the microprocessor 200 detects an error condition, then control passes on line 302 and follows the sequence through operation blocks 304, 308 and 312 as afore-described. One possible error condition would be the detection of a loss of traction in the rear wheels (i.e. wheel spin). Other error conditions may be tested such as engine overheating or low oil pressure in a manner well known to those skilled in the art.

If no error conditions are detected by the microprocessor 200, then control passes on line 332 to decision block 334. If the nitrous oxide timer has not exceeded a pre-set minimum delay chosen by the nitrous system programmer, then control passes on line 306 and follows the sequence through operation blocks 308 and 312 in the manner described hereinbefore.

If the timer value (incremented once every tenth of a second) exceeds the delay value, then control passes on line 336 to operation block 338. The operations in block 338 are executed essentially simultaneously and are coordinated for optimal operation of the engine 2 while the nitrous oxide delivery system is administering the nitrous oxide to the cylinders 6 of the engine 2. A memory location accessed by the microprocessor 200 based upon the engine speed provides a spark retard value. However, in other embodiments of the invention, the spark retard value to adjust the spark advance may be determined by other operating conditions such as the throttle position, manifold absolute pressure, or the fuel or nitrous oxide flow rate. The magnitude of the retard value determines the extent to which the spark advance will be retarded (i.e. decreased). The microprocessor 200 combines the retard value with the initial spark advance value to provide an actual spark advance value which is loaded into memory in the microprocessor 200. The microprocessor 200 will then transmit an appropriate spark timing signal on line 116 to the ignition module 72 in order to adjust the spark advance the desired amount. This output procedure is executed by a programmed interrupt which occurs once per reference signal received from the ignition module 72 on line 42 or alternatively, from the ignition coil primary in a manner well known in the art.

Figure 7:
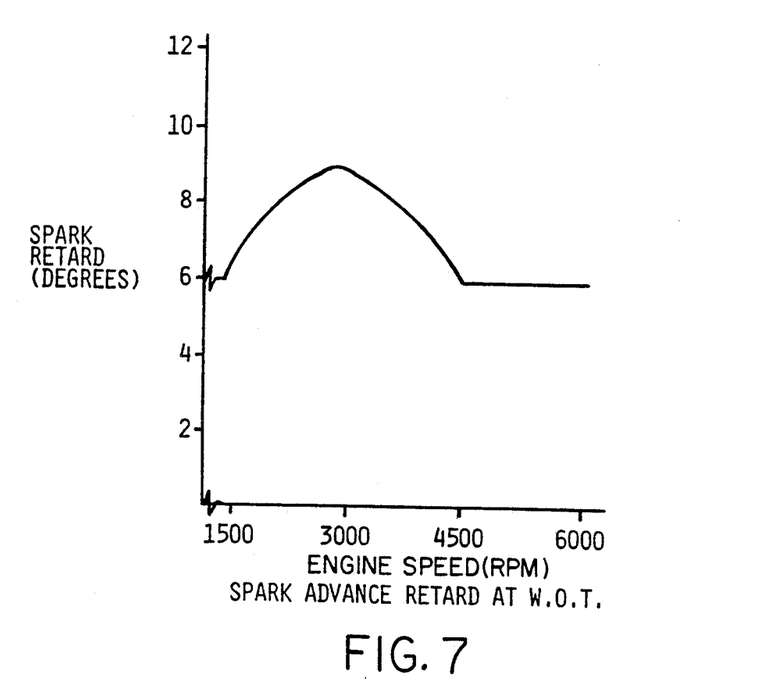
FIG. 7 is a graphical representation of the retard curve for adjusting the spark advance at a wide open throttle.

In the preferred embodiment of this system, the microprocessor 200 retrieves the spark advance value from a look-up table contained in electronically erasable programmable read only memory (EEPROM) 52 which is referenced according to the current engine speed and either the throttle position or manifold absolute pressure. The engine speed, throttle position and manifold absolute pressure are stored in predetermined memory locations in the memory of microprocessor 200. Exemplary retard signals for wide open throttle at various engine speeds are shown in FIG. 7. At the lower engine speeds the retard only compensates for the increased rate at which the nitrous oxide enhanced air/fuel mixture burns. However, as the engine speed increases (1500 to 3000 rpm), the retard is increased so that the force delivered from the cylinders 6 to the pistons and drive train is not maximized. This prevents the torque exerted by the pistons on the drive train from exceeding the structural limits of the drive train of the vehicle. As the engine speed advances toward the upper level of the engine speed spectrum (3000 to 6000 rpm), output power begins to decrease and thus the retard can be reduced in order to harness more of the energy produced by the burning air/fuel mixture.

Figure 8:
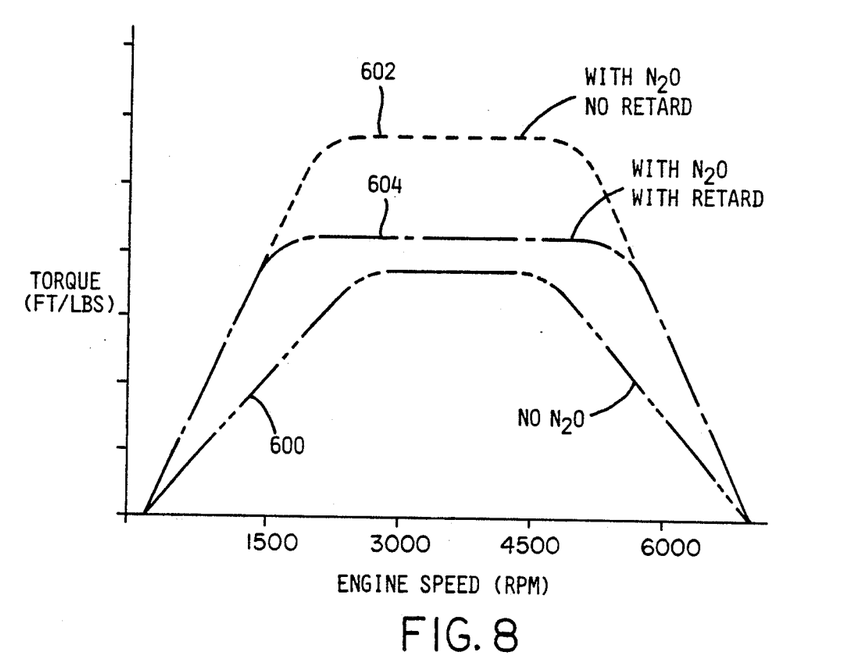
FIG. 8 is a set of hypothetical power curves illustrating the effects of nitrous oxide and spark retard in an internal combustion engine.

FIG. 8 illustrates the effect of the retard on the power curve of the engine under wide open throttle (WOT) conditions. Curve 600 illustrates a hypothetical power curve for an engine burning a standard air/fuel mixture under WOT conditions. Curve 602 illustrates a hypothetical maximum power curve for an engine burning a nitrous oxide enhanced air/fuel mixture under WOT conditions. Curve 604 illustrates the effect of the spark advance retard function (illustrated in FIG. 7) upon the power curve of an engine burning a nitrous oxide enhanced air/fuel mixture. Thus, one benefit obtained from retarding the spark advance as graphically depicted in FIG. 7 is the broadening of an engine's power spectrum without the engine producing intolerably high torque which would harm the engine or drive train.

The second operation executed in block 338 is the adjustment of the fuel flow. The nitrous oxide delivery system illustrated in FIG. 1 increases the rate at which fuel is delivered to the cylinders 6 in accordance with the increase in oxidizing agent delivered to the cylinders 6. The increase in fuel is initially determined by a look-up table stored in EEPROM 52. Although currently the fuel adjustment value is not based upon engine operating parameters, an obvious improvement to the current invention would be to reference the amount of additional fuel needed based upon other relevant parameters such as the rate at which nitrous oxide is delivered to the cylinders. This is especially true in systems where the rate of nitrous oxide flow is adjustable.

In the last operation listed in block 338, the system administers nitrous oxide by opening the nitrous oxide solenoids 96. Nitrous oxide is then delivered at a rate such that it may combine with the additional fuel in order to achieve a desired air/fuel ratio. In the preferred embodiment, the desired ratio is 12.5 to 1.

After executing the operations in block 338, program execution passes on line 310 to operation block 312. As was mentioned above, the microprocessor 200 executes a series of standard engine control operations well known to those skilled in the art. One operation executed by the microprocessor is the final calculation of the amount of fuel to be delivered to the engine 2. This value is determined by first obtaining a base fuel value then adjusting this value by the enhancement factor determined in the nitrous oxide control loop afore-described. A final adjustment is made to the fuel quantity based upon the oxygen sensor feedback. This final fuel quantity value is stored in a predetermined memory location in the microprocessor 200 to be transmitted to the fuel injector controller. When the microprocessor 200 receives the reference signal on line 42, an interrupt occurs and the fuel quantity is determined by signals transmitted by the ECU 24 on fuel injector control line(s) 80.

Figure 10:
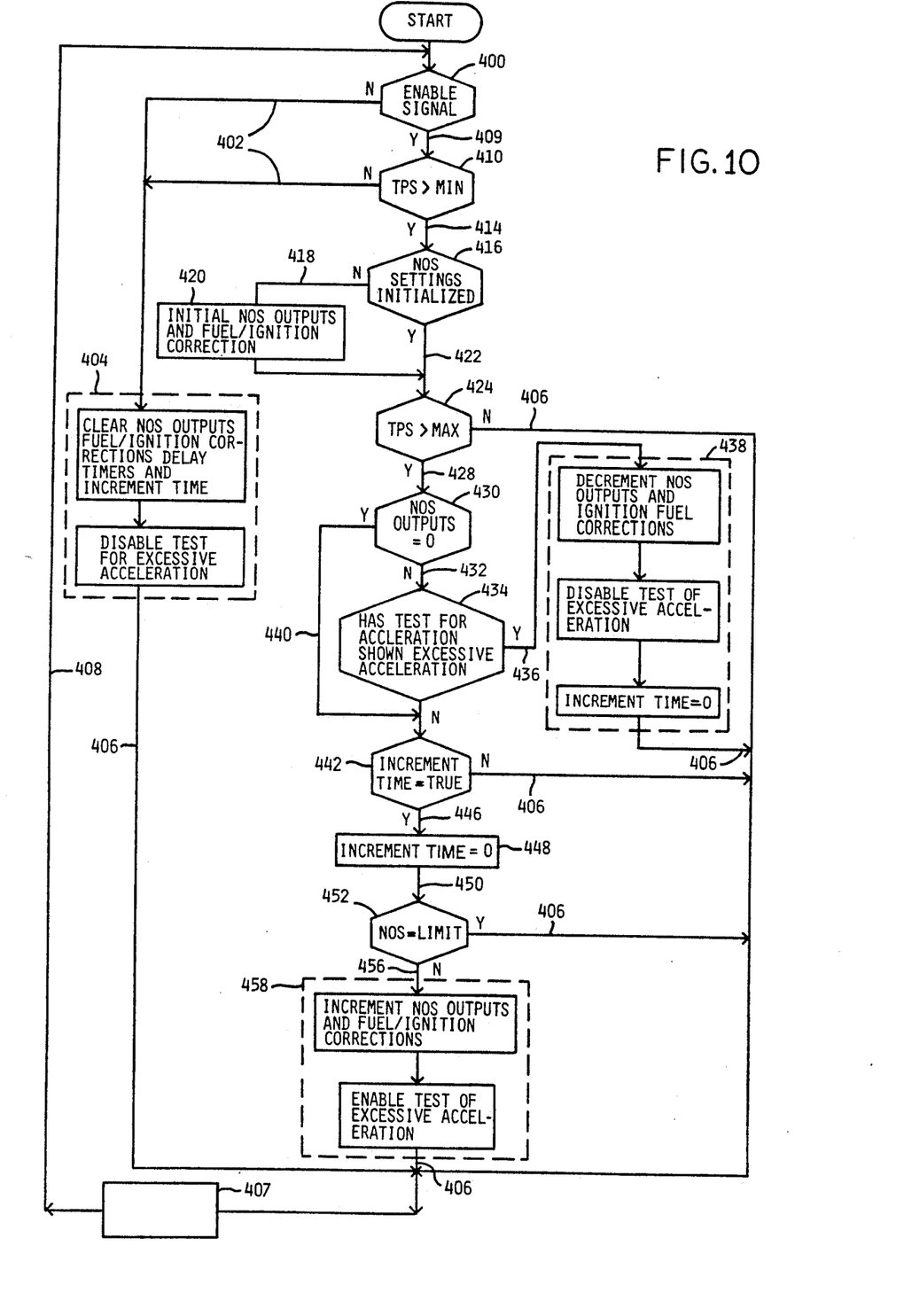
FIG. 10 is an alternative flow diagram illustrating the flow of control in the microprogram for controlling an improved system which gradually increases the delivery rate of nitrous oxide.

FIG. 10 illustrates an alternative nitrous oxide delivery system control loop. In this embodiment, the nitrous oxide is delivered before the throttle is wide open and the delivery rate of the nitrous oxide is gradually increased over a period of time. This control loop, like the control loop illustrated in FIG. 6 may be executed in the background by the microprocessor 200 of the ECU 24 illustrated in FIG. 3 in a continuous loop.

In its normal background execution cycle, the microprocessor 200 first determines whether the ECU received the nitrous enable signal on line 30. Decision block 400 represents this initial state. If the operator has not enabled the nitrous oxide system, control passes on line 402 to operation block 404. At operation block 404 the microprocessor 200 sets the nitrous oxide signals on lines 90 to off, sets the fuel adjustment value to zero, sets the nitrous oxide spark retard value to zero degrees, sets the nitrous oxide delay timer to zero and then resets the increment flag to false. In addition, the test for loss of vehicle acceleration due to the loss of wheel traction is disabled.

After executing the last operation in block 404, computer operation passes on line 406 to block 407 where the microprocessor 200 executes the remaining engine control procedures which are well known to those skilled in the art. In systems containing an oxygen sensor feedback mechanism such as the oxygen sensor unit 21 illustrated in FIG. 1, one noteworthy procedure executed by the microprocessor 200 in block 407 adjusts the fuel flow in response to an improper concentration of oxygen in the exhaust. After the procedures for controlling the vehicle operation are executed in block 407, control then passes on line 408 to the beginning of the control loop at decision block 400 where the microprocessor 200 once again tests whether the operator has enabled the nitrous oxide delivery system.

If the enable signal on line 30 has been activated, then control passes on line 409 to decision block 410. The microprocessor 200 compares the current throttle position value stored in memory to a pre-selected threshold throttle opening value for determining whether to commence delivery of nitrous oxide to the engine 2. If the current throttle position does not exceed the preselected minimum, then control passes on line 402 and follows the sequence through operation blocks 404 and 407 as afore-described.

If the throttle position exceeds the pre-selected minimum, then control passes on line 414 to decision block 416. The microprocessor 200 polls the fuel, nitrous oxide, and ignition adjustment control registers to determine whether they have been initialized. If the registers have not yet been initialized, the microprocessor loads these registers with appropriate initial values. In addition, the microprocessor 200 transmits appropriate control signals on the nitrous oxide control lines 90 to open the nitrous oxide delivery valve(s) 90 to deliver an initial amount of nitrous oxide to the engine 2. Control then passes on line 422 to decision block 424. If the settings have already been initialized, then block 420 is bypassed and control flows directly to decision box 424. The microprocessor 200 determines whether the throttle position exceeds a pre-set threshold for incrementing the quantity of fuel and nitrous oxide delivered to the engine. If the throttle position does not exceed the threshold, then control will flow on line 406 to operation block 407 as afore-described.

If the throttle position however does exceed the maximum, then control flows on line 428 to decision block 430. The microprocessor 200 determines whether the nitrous oxide outputs are closed. If the outputs are not closed, then control flows on line 432 to decision block 434. The microprocessor 200 determines whether the detected velocity of the front wheels matches the velocity of the rear wheels in order to further determine whether traction has been lost. Alternatively, the microprocessor 200 may receive a signal from an accelerometer in order to detect the loss of vehicle acceleration thus indicating a loss of drive wheel traction. If the wheels are slipping, then control flows on line 436 to operation block 438. The microprocessor 200 reduces the flow of nitrous oxide and corrects the values of the fuel flow and spark advance to reflect the lower flow rate of nitrous oxide. The microprocessor 200 disables the test for wheel-spin and sets the increment flag to false. Control then flows on line 406 to operation block 407 as afore-described. If however the microprocessor 200 at decision block 434 does not detect wheel-spin, then control flows on line 440 to decision block 442. Decision block 442 may also be reached if at decision block 430, the microprocessor determines that the nitrous oxide valves are closed.

At decision block 442 the microprocessor 200 determines whether or not a sufficient delay has occurred so that the nitrous oxide and fuel delivery may be increased. If sufficient time has not elapsed, then control flows on line 406 out of the control loop. If the time to increment the amount of nitrous oxide delivered to the system has arrived, then control passes on line 446 to operation block 448 where the microprocessor 200 resets the increment time indicator and control passes on line 450 to decision block 452. If the nitrous oxide flow rate has reached its maximum, then control flows on line 406 to operation block 407 and execution of the control loop continues as afore-described If the nitrous oxide flow rate has not reached the maximum, then control passes on line 456 to operation block 458. The microprocessor 200 increases the nitrous oxide valve opening, increases the rate of fuel delivery, and adjusts the spark advance in accordance with the increased air/fuel density in the cylinders 6. The microprocessor 200 enables the test for excessive acceleration and control passes on line 406 to operation block 407 as afore-described.

It should be understood that the two examples of control loops for administering nitrous oxide to an engine were two of many possible control loops which could be developed for using the disclosed input signals and various control signal configurations to control the operation of an engine selectively supplied with an enhanced air/fuel mixture. The formulation of alternative control loops for coordinating nitrous oxide delivery, fuel delivery, and spark timing would be well within the ordinary skill in the art.

Three alternative valve configurations for administering the additional nitrous oxide in the manner disclosed in the control loop illustrated in FIG. 10 are proposed. The first valve configuration, illustrated in FIG. 1, delivers a variable amount of nitrous oxide in discrete steps. The latter two nitrous oxide valve configurations illustrated in FIG. 2 provide essentially continuously variable amounts of nitrous oxide.

Figure 9:
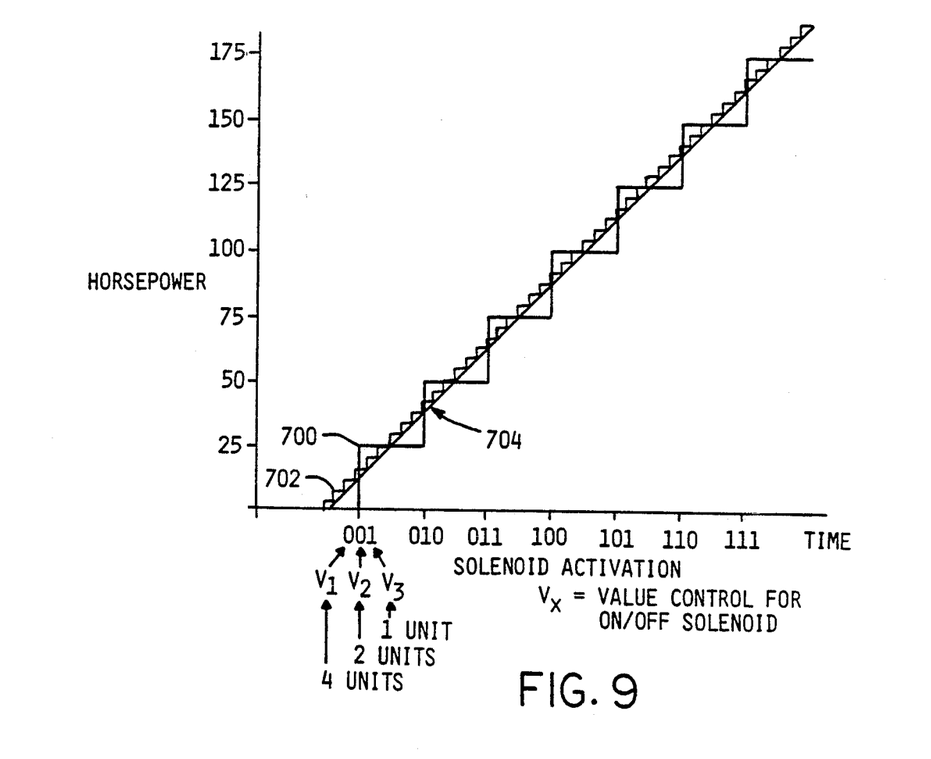
FIG. 9 is a graphical illustration of the level of nitrous oxide delivered to an internal combustion in an administration scheme in which the amount of nitrous oxide is gradually increased.

In the first valve configuration illustrated in FIG. 1, the ECU transmits appropriate signals on lines 90 to nitrous oxide solenoids 96. Nitrous oxide flows through the solenoids 96 at a constant, fixed, rate until appropriate shut-off signals are relayed to the solenoid valves 96. In the proposed embodiment of the nitrous oxide delivery system, the amount of nitrous oxide delivered to cylinders 6 may be adjusted in steps by selectively turning on and off a set of three solenoids 96 connected by supply lines 104 to spray bars 106 in spacer plates 108 mounted in front of the air intake manifold 9. Each spray bar 106 is capable of delivering a different quantity of nitrous oxide and the amount of nitrous oxide delivered by each spray bar 106 is approximately twice as large as the next smaller spray bar 106. In a nitrous oxide delivery system where "n" spray bars are used, a stepped nitrous oxide flow rate can be achieved for administering between 1 unit to $2^{**}n-1$ units of nitrous oxide to the cylinders 6 by selectively turning on and off the nitrous oxide solenoids 96 by transmitting appropriate signals on lines 90. Each stepped increase or decrease in the amount of nitrous oxide administered must be at least one unit. This step function is illustrated by stepped line segment 700 in FIG. 9. It is not necessary for the increase to follow the progression depicted in segment 500. Other step functions particularly suited to the needs of the designer would be well known to those skilled in the art. Furthermore, it is not necessary that the progression be a function of time. The incorporation of additional/alternative factors such as wheel traction and throttle position would be suitable factors for determining the shape of the step function.

Alternatively, one may choose to utilize a single pulse-width modulated valve in a configuration illustrated in FIG. 2. Control signals transmitted on line 90 to the valve 96 determine the percentage of time the valve 96 allows nitrous oxide to flow and thus the amount of nitrous oxide delivered by the spray bar 106. This method allows the system designer to step the amount of nitrous oxide delivered to the air/fuel mixture in smaller steps as illustrated by segment 702 in FIG. 9. A designer of a nitrous system may also wish to use a constant flow/variable rate valve in a configuration illustrated in FIG. 2. Control signals transmitted on line 90 to the valve 96 determine the size of the adjustable valve opening and thus the amount of nitrous oxide flowing through this valve. This method would theoretically allow a gradual continuous increase as illustrated by segment 704 in FIG. 9. In actual practice, however, the valve opening is adjusted in a stepped fashion during the execution of the control loop illustrated in FIG. 10 and therefore this method, too, displays a stepped increase such as the one illustrated in segment 702.

While several embodiments of the invention are illustrated, it will be understood, of course, that the invention is not limited thereto. Those skilled in the art to which the invention pertains may make modifications and other embodiments employing the principles of this invention, particularly upon considering the foregoing teachings.

What is claimed is:

1. An internal combustion engine system wherein the density of a combustible mixture provided to the cylinders of an engine is selectively enhanced by delivering a supplemental oxidizing agent and additional fuel to said combustible mixture provided to the cylinders of said engine, said system comprising:
- a set of fuel injectors having an adjustable duty cycle for delivering a quantity of fuel to each of the cylinders;
- supplemental oxidizing agent delivery means;
- first means for activating said supplemental oxidizing agent delivery means in order to commence the addition of said supplemental oxidizing agent to said combustible mixture;
- third means for adjusting fuel flow into said combustible mixture by transmitting appropriate signals to the set of fuel injectors extending or reducing the duty cycle of the fuel injectors, said fuel flow being adjusted at least in accordance with the flow rate of said supplemental oxidizing agent to prevent a lean fuel-air mixture.

2. A system for regulating power output of an internal combustion engine wherein the density of a combustible mixture provided to the cylinders of said engine is selectively enhanced by delivering a supplemental oxidizing agent and additional fuel to said combustible mixture for the cylinders of said engine; said system comprising:
- supplemental oxidizing agent delivery means;
- fuel delivery means;
- first means for activating said supplemental oxidizing agent delivery means in order to commence the addition of said supplemental oxidizing agent to said combustible mixture;
- second means for controlling the rate at which said supplemental oxidizing agent delivery means adds said supplemental oxidizing agent to said combustible mixture;
- third means for adjusting fuel flow rate into said combustible mixture, said fuel flow rate being adjusted at least in accordance with the flow rate of said supplemental oxidizing agent; and
- fourth means for adjusting ignition timing of said combustible mixture at least in accordance with the concentration of said combustible mixture contained within said cylinders.

3. The system of claim 2 further comprising means for sensing the speed of said engine and transmitting a first signal representative of said sensed engine speed; and
- means for receiving said first signal and further adjusting ignition timing in response to at least said first signal.

4. The system of claim 2 further comprising means for sensing engine knock and wherein said fourth means further adjusts ignition timing of said combustible mixture in said cylinders in response to said sensed engine knock.

5. The system of claim 2 further comprising:
- means for providing a feedback signal representing the concentration of oxygen in the exhaust from said internal combustion engine, the magnitude of said feedback signal indicating the amount of deviation from an ideal oxygen concentration in said exhaust; and wherein said
- third means receives said feedback signal and further adjusts fuel flow in response to said feedback signal, the magnitude of said fuel flow adjustment being responsive to the deviation of the magnitude of said feedback signal from a set point.

6. The system of claim 2 wherein said third means transmits appropriate control signals to said fuel delivery means individually mounted proximate to said cylinders.

7. The system of claim 2 wherein said first means activates said supplemental oxidizing agent delivery means in response to the detected occurrence of at least one pre-determined engine operating condition precedent after the operator has enabled the system.

8. The system of claim 2 wherein said supplemental oxidizing agent delivery means comprises a plurality of on/off solenoid valves; and
- said second means transmits appropriate signals to selectively open and close one or more of said plurality of on/off solenoid valves in order to adjust the flow rate of said supplemental oxidizing agent.

9. The system of claim 2, wherein said supplemental oxidizing agent delivery means comprises one or more pulse width modulated valves; and
- said second means transmits appropriate signals to vary the duty cycle of one or more of said pulse width modulated valves in order to adjust the average flow rate of said supplemental oxidizing agent.

10. The system of claim 2 wherein said supplemental oxidizing agent delivery means comprises one or more constant flow/variable flow rate valves; and
- said second means transmits appropriate signals to vary the size of the opening of one or more of said constant flow/variable flow rate valves in order to adjust the flow rate of said supplemental oxidizing agent.

11. The system of claim 2 wherein said second means adjustably decreases the flow rate of said supplemental oxidizing agent from said supplemental oxidizing agent delivery means in response to the detected loss of traction of the vehicle's wheels.

12. A system for regulating power output of an internal combustion engine wherein the density of a combustible mixture provided to the cylinders of said engine is selectively enhanced by delivering a supplemental oxidizing agent and additional fuel to said combustible mixture for the cylinders of said engine; said system comprising:
- supplemental oxidizing agent delivery means;
- fuel delivery means;
- means for sensing the speed of said engine and transmitting a first signal representative of said sensed engine speed;
- first means for activating said supplemental oxidizing agent delivery means in order to commence the addition of said supplemental oxidizing agent to said combustible mixture;
- third means for adjusting fuel flow rate into said combustible mixture, said fuel flow rate being adjusted at least in accordance with the flow rate of said supplemental oxidizing agent;
- fourth means for adjusting ignition timing of said combustible mixture at least in accordance with the concentration of said combustible mixture contained within said cylinders; and
- fifth means for receiving said first signal and further adjusting ignition timing in response to at least said first signal.

13. The system of claim 12 further comprising means for sensing engine knock and wherein said fourth means further adjusts ignition timing of said combustible mixture in said cylinders in response to said sensed engine knock.

14. The system of claim 12, further comprising:

means for providing a feedback signal representing the concentration of oxygen in the exhaust from said internal combustion engine, the magnitude of said feedback signal indicating the amount of deviation from an ideal oxygen concentration in said exhaust; and wherein said third means receives said feedback signal and further adjusts fuel flow in response to said feedback signal, the magnitude of said fuel flow adjustment being responsive to the deviation of the magnitude of said feedback signal from a set point.

15. The system of claim 12 wherein said third means transmits appropriate control signals to fuel delivery means individually mounted proximate to said cylinders.

16. The system of claim 12 wherein said first means activates said supplemental oxidizing agent delivery means in response to the detected occurrence of at least one pre-determined engine operating condition precedent after the operator has enabled the system.

17. The system of claim 12 further comprising a second means for controlling the rate at which said supplemental oxidizing agent delivery means adds said supplemental oxidizing agent to said combustible mixture.

18. The system of claim 17 wherein said supplemental oxidizing agent delivery means comprises a plurality of on/off solenoid valves; and said second means transmits appropriate signals to selectively open and close one or more of said plurality of on/off solenoid valves in order to adjust the flow rate of said supplemental oxidizing agent.

19. The system of claim 17 wherein said supplemental oxidizing agent delivery means comprises one or more pulse width modulated valves; and said second means transmits appropriate signals to vary the duty cycle of one or more of said pulse width modulated valves in order to adjust the average flow rate of said supplemental oxidizing agent.

20. The system of claim 17 wherein said supplemental oxidizing agent delivery means comprises one or more constant flow/variable flow rate valves; and said second means transmits appropriate signals to vary the size of the opening of one or more of said constant flow/variable flow rate valves in order to adjust the flow rate of said supplemental oxidizing agent.

21. A system for regulating power output of an internal combustion engine wherein the density of a combustible mixture provided to the cylinders of said engine is selectively enhanced by delivering a supplemental oxidizing agent and additional fuel to said combustible mixture for the cylinders of said engine; said system comprising:

supplemental oxidizing agent delivery means;
fuel delivery means;
first means for activating said supplemental oxidizinq agent delivery means in order to commence the addition of said supplemental oxidizing agent to said combustible mixture in response to the detected occurrence of at least one pre-determined engine operating condition precedent after the operator enables the system.

third means for adjusting fuel flow rate into said combustible mixture, said fuel flow rate being adjusted at least in accordance with the flow rate of said supplemental oxidizing agent; and fourth means for adjusting ignition timing of said combustible mixture at least in accordance with the concentration of said combustible mixture contained within said cylinders.

22. The system of claim 21 further comprising means for sensing the speed of said engine and transmitting a first signal representative of said sensed engine speed; and means for receiving said first signal and further adjusting ignition timing in response to at least said first signal.

23. The system of claim 22 further comprising:

means for providing a feedback signal representing the concentration of oxygen in the exhaust from said internal combustion engine, the magnitude of said feedback signal indicating the amount of deviation from an ideal oxygen concentration in said exhaust; and wherein said third means receives said feedback signal and further adjusts fuel flow in response to said feedback signal, the magnitude of said fuel flow adjustment being responsive to the deviation of the magnitude of said feedback signal from a set point.

24. The system of claim 22 further comprising means for sensing engine knock and wherein said fourth means further adjusts ignition timing of said combustible mixture in said cylinders in response to said sensed engine knock.

25. The system of claim 22 wherein said third means transmits appropriate control signals to fuel delivery means individually mounted proximate to said cylinders.

26. The system of claim 22 further comprising a second means for controlling the rate at which said supplemental oxidizing agent delivery means adds said supplemental oxidizing agent to said combustible mixture.

27. The system of claim 26 wherein said supplemental oxidizing agent delivery means comprises a plurality of on/off solenoid valves; and said second means transmits appropriate signals to selectively open and close one or more of said plurality of on/off solenoid valves in order to adjust the flow rate of said supplemental oxidizing agent.

28. The system of claim 26 wherein said supplemental oxidizing agent delivery means comprises one or more pulse width modulated valves; and said second means transmits appropriate signals to vary the duty cycle of one or more of said pulse width modulated valves in order to adjust the average flow rate of said supplemental oxidizing agent.

29. The system of claim 26 wherein said supplemental oxidizing agent delivery means comprises one or more constant flow/variable flow rate valves; and said second means transmits appropriate signals to vary the size of the opening of one or more of said constant flow/variable flow rate valves in order to adjust the flow rate of said supplemental oxidizing agent.

30. A system for regulating power output of an internal combustion engine wherein the density of a combustible mixture provided to the cylinders of said engine is selectively enhanced by delivering a supplemental oxidizing agent and additional fuel to said combustible mixture for the cylinders of said engine; said system comprising:

supplemental oxidizing agent delivery means;
fuel delivery means;

first means for activating said supplemental oxidizing agent delivery means in order to commence the addition of said supplemental oxidizing agent to said combustible mixture;

third means for adjusting fuel flow rate into said combustible mixture, said fuel flow rate being adjusted at least in accordance with the flow rate of said supplemental oxidizing agent;

means for providing a feedback signal representing the concentration of oxygen in the exhaust from said internal combustion engine, the magnitude of said feedback signal indicating the amount of deviation from an ideal oxygen concentration in said exhaust; and wherein said third means receives said feedback signal and further adjusts fuel flow in response to said feedback signal, the magnitude of said fuel flow adjustment being responsive to the deviation of the magnitude of said feedback signal from a set point; and fourth means for adjusting ignition timing of said combustible mixture at least in accordance with the concentration of said combustible mixture contained within said cylinders.

31. A system for regulating power output of an internal combustion engine wherein the density of a combustible mixture provided to the cylinders of said engine is selectively enhanced by delivering a supplemental oxidizing agent and additional fuel to said combustible mixture for the cylinders of said engine; said system comprising:

supplemental oxidizing agent delivery means;

fuel delivery means;

first means for activating said supplemental oxidizing agent delivery means in order to commence the addition of said supplemental oxidizing agent to said combustible mixture;

third means for adjusting fuel flow rate into said combustible mixture, said fuel flow rate being adjusted at least in accordance with the flow rate of said supplemental oxidizing agent; and wherein said third means transmits appropriate control signals to said fuel delivery means individually mounted proximate to said cylinders; and fourth means for adjusting ignition timing of said combustible mixture at least in accordance with the concentration of said combustible mixture contained within said cylinders.

32. A method for regulating power output of an internal combustion engine wherein the density of a combustible mixture provided to the cylinders of said engine is selectively enhanced by delivering a supplemental oxidizing agent and additional fuel to said combustible mixture for the cylinders of said engine; said method comprising the following steps:

first step of testing for appropriate conditions for commencing delivery of said supplemental oxidizing agent to said combustible mixture;

second step of commencing delivery of said supplemental oxidizing agent when said appropriate conditions have been detected; combustible mixture, said fuel flow rate being adjusted at least in accordance with the flow rate of said supplemental oxidizing agent; and fourth step of adjusting ignition timing of said combustible mixture in accordance with the concentration of the combustible mixture contained within the cylinders and in accordance with the engine speed.

33. The method of claim 32 further comprising:

fifth step of generating a feedback signal representing the concentration of oxygen in the exhaust from said internal combustion engine, the magnitude of said feedback signal indicating the amount of deviation from an ideal oxygen concentration in said exhaust, and receiving said feedback signal and further adjusting fuel flow in response to said feedback signal, the magnitude of said increase or decrease being responsive to the deviation of the magnitude of said feedback signal from a set point.

34. A method for regulating power output of an internal combustion engine wherein the density of a combustible mixture provided to the cylinders of said engine is selectively enhanced by delivering a supplemental oxidizing agent and additional fuel to said combustible mixture for the cylinders of said engine; said method comprising the following steps:

first step of testing for appropriate conditions for commencing delivery of said supplemental oxidizing agent to said combustible mixture;

second step of commencing delivery of said supplemental oxidizing agent at an initial flow rate which is less than the maximum flow rate when said appropriate conditions have been detected;

third step of testing for loss of wheel traction, and decreasing the flow rate of said supplemental oxidizing agent to said combustible mixture; and fourth step of testing whether a required period has elapsed since the flow rate of said supplemental oxidizing agent was adjusted, and if said required period has elapsed performing the following additional steps comprising:

resetting a period timer; and testing whether the flow rate of said supplemental oxidizing agent has attained a maximum value, and if the flow rate has not reached a maximum, then increasing the flow rate of said supplemental oxidizing agent, increasing the fuel flow rate, adjusting the ignition timing of said combustible mixture.

35. The method of claim 34 further comprising:

fifth step of generating a feedback signal representing the concentration of oxygen in the exhaust from said internal combustion engine, the magnitude of said feedback signal indicating the amount of deviation from an ideal oxygen concentration in said exhaust, and receiving said feedback signal and further adjusting fuel flow in response to said feedback signal, the magnitude of said increase or decrease being responsive to the deviation of the magnitude of said feedback signal from a set point.

* * * * *